US012592928B1

(12) United States Patent
Vaknin et al.

(10) Patent No.: US 12,592,928 B1
(45) Date of Patent: Mar. 31, 2026

(54) MANAGEMENT OF ACCESS TO RESOURCES BY USERS

(71) Applicant: Valkyrie Security Ltd, Tel-Aviv (IL)

(72) Inventors: Or Vaknin, Tel Aviv (IL); Uriel Biton, Tel Aviv (IL); Efi Waissman, Gedera (IL)

(73) Assignee: Valkyrie Security Ltd, Tel-Aviv (IL)

( * ) Notice: Subject to any disclaimer, the term of this patent is extended or adjusted under 35 U.S.C. 154(b) by 0 days.

(21) Appl. No.: 19/006,320

(22) Filed: Dec. 31, 2024

(51) Int. Cl.
    *H04L 9/40* (2022.01)

(52) U.S. Cl.
    CPC .......... *H04L 63/102* (2013.01); *H04L 63/083* (2013.01); *H04L 63/1433* (2013.01)

(58) Field of Classification Search
    CPC . H04L 63/102; H04L 63/083; H04L 63/1433; G06F 21/31
    See application file for complete search history.

(56) References Cited

U.S. PATENT DOCUMENTS

| | | | | |
|---|---|---|---|---|
| 10,341,410 | B2 * | 7/2019 | Lander | H04L 67/56 |
| 10,484,382 | B2 * | 11/2019 | Wilson | H04L 63/0281 |
| 11,057,393 | B2 * | 7/2021 | Coffing | G06Q 20/40 |
| 11,108,828 | B1 * | 8/2021 | Curtis | H04L 63/104 |
| 11,366,920 | B1 * | 6/2022 | Carru | G06F 21/6218 |
| 11,711,374 | B2 * | 7/2023 | Ross | G06F 21/604 |
| | | | | 726/28 |
| 11,991,216 | B1 * | 5/2024 | Venkatachari | H04L 63/20 |
| 12,021,888 | B1 * | 6/2024 | Reed | H04L 63/1425 |
| 12,132,735 | B1 * | 10/2024 | Razavi | H04L 63/10 |
| 2014/0181914 | A1 * | 6/2014 | Kling | H04L 63/10 |
| | | | | 726/4 |
| 2014/0289796 | A1 * | 9/2014 | Moloian | H04L 63/101 |
| | | | | 726/2 |
| 2017/0111338 | A1 * | 4/2017 | Malatesha | H04L 67/1097 |
| 2021/0096938 | A1 * | 4/2021 | Dev | H04L 67/133 |
| 2021/0136101 | A1 * | 5/2021 | Ben-Yosef | H04L 63/1433 |
| 2021/0168150 | A1 * | 6/2021 | Ross | G06F 16/9024 |
| 2021/0289262 | A1 * | 9/2021 | O'Connor | H04N 21/251 |
| 2022/0122195 | A1 * | 4/2022 | Alameddine | G06F 21/31 |
| 2022/0147622 | A1 * | 5/2022 | Chesla | G06N 7/01 |
| 2022/0286466 | A1 * | 9/2022 | Thakur | H04L 63/104 |

(Continued)

OTHER PUBLICATIONS

Hammann, Sven, et al. "User account access graphs." Proceedings of the 2019 ACM SIGSAC Conference on Computer and Communications Security. 2019, pp. 1405-1422. (Year: 2019).*

(Continued)

*Primary Examiner* — Kari L Schmidt

(57) ABSTRACT

There is provided a computer implemented method of managing access for user account, comprising: accessing a graph mapping a plurality of nodes denoting real users to a plurality of user accounts and a plurality of resources hosted by a plurality of service computing environments external to a target computing environment accessed by the user accounts, and defining different permissions for user accounts for accessing the different resources, receiving a query for identifying user accounts for a target user, executing the query on the graph, and providing details regarding user accounts of the target users from the execution of the query on the graph, the details including at least one of: identifiers of the user accounts, resources accessible to the user accounts, access privileges for accessing the resources.

29 Claims, 10 Drawing Sheets

(56) References Cited

U.S. PATENT DOCUMENTS

| 2023/0093003 | A1* | 3/2023 | Ithal ..................... | G06F 16/211 |
| | | | | 726/25 |
| 2023/0132703 | A1* | 5/2023 | Marsenic ........... | H04L 63/1433 |
| | | | | 726/25 |
| 2023/0135660 | A1* | 5/2023 | Chapman ....... | G06Q 10/063114 |
| | | | | 705/7.38 |
| 2023/0205898 | A1* | 6/2023 | Venable .............. | G06F 21/6227 |
| | | | | 726/26 |
| 2024/0289437 | A1* | 8/2024 | Shemesh ............. | G06F 9/45558 |
| 2025/0039198 | A1* | 1/2025 | Murugesan ......... | H04L 63/1416 |
| 2025/0094615 | A1* | 3/2025 | Blackwell, II ...... | G06F 21/6218 |
| 2025/0225264 | A1* | 7/2025 | Khare .................. | G06F 21/604 |
| 2025/0307361 | A1* | 10/2025 | Khare ................. | G06F 21/6218 |
| 2025/0373670 | A1* | 12/2025 | Ough .................. | G06N 3/0455 |

OTHER PUBLICATIONS

B. Suzic, "User-centered security management of API-based data integration workflows," NOMS 2016—2016 IEEE/IFIP Network Operations and Management Symposium, Istanbul, Turkey, 2016, pp. 1233-1238. (Year: 2016).*
S. Tuecke et al., "Globus auth: A research identity and access management platform," 2016 IEEE 12th International Conference on e-Science (e-Science), Baltimore, MD, USA, 2016, pp. 203-212. (Year: 2016).*

* cited by examiner

Trigger discovery process 402

Create connector response schema 404

Implement API 406

Add a connector to a connector interface 408

Send API requests 410

Retrieve API responses 412

Transform API responses into connector response schemas 414

Create and/or update graph 416

Iterate 418

702

902

3502

MANAGEMENT OF ACCESS TO RESOURCES BY USERS

BACKGROUND

The present invention, in some embodiments thereof, relates to access management and, more specifically, but not exclusively, to systems and methods for managing access of users to resources.

Managing access of users to network resources involves defining permissions based on roles, authentication methods, and authorization policies. Access control models such as Role-Based Access Control (RBAC), Mandatory Access Control (MAC), and Discretionary Access Control (DAC) help enforce who can access what resources. Security policies ensure appropriate user access based on their identity and role, while audit logs track usage.

SUMMARY

According to a first aspect, a computer implemented method of managing adaptive just-in-time (JIT) access requests, comprises: receiving a JIT access request, the JIT access request including an identity of a user making the request, and a target resource to which access is requested, automatically accessing additional data associated with the identity of the user, automatically analyzing the JIT access request in view of the additional data, in response to the analysis meeting a target requirement, automatically granting temporary access to the user to access the target resource for a defined time interval, and automatically revoking the temporary access in response to expiration of the defined time interval.

According to a second aspect, a system for managing adaptive just-in-time (JIT) access requests, comprises: at least one processor executing a code for: receiving a JIT access request, the JIT access request including an identity of a user making the request, and a target resource to which access is requested, automatically accessing additional data associated with the identity of the user, automatically analyzing the JIT access request in view of the additional data, in response to the analysis meeting a target requirement, automatically granting temporary access to the user to access the target resource for a defined time interval, and automatically revoking the temporary access in response to expiration of the defined time interval.

According to a third aspect, a non-transitory medium storing program instructions for managing adaptive just-in-time (JIT) access requests, comprising program instructions which when executed by at least one processor, cause the at least one processor to: receive a JIT access request, the JIT access request including an identity of a user making the request, and a target resource to which access is requested, automatically access additional data associated with the identity of the user, automatically analyze the JIT access request in view of the additional data, in response to the analysis meeting a target requirement, automatically grant temporary access to the user to access the target resource for a defined time interval, and automatically revoke the temporary access in response to expiration of the defined time interval.

In a further implementation form of the first, second, and third aspects, the JIT access request further includes a requested permission level, and the analysis is performed in view of the requested permission level.

In a further implementation form of the first, second, and third aspects, the temporary access is granted without requiring a password for accessing the target resource by the user within the defined time interval.

In a further implementation form of the first, second, and third aspects, the analysis is performed by applying a set of rules defining a risk policy, wherein the target requirement is met when the set of rules is met.

In a further implementation form of the first, second, and third aspects, the analysis is performed by computing a score indicating likelihood of a security threat, and target requirement is met when the score is less than a threshold indicating a tolerated security risk.

In a further implementation form of the first, second, and third aspects, the analysis is performed by identifying at least one contradiction between the additional data and the JIT access request, and the target requirement is met when there is no contradiction.

In a further implementation form of the first, second, and third aspects, the user is a member of a group that includes other users, wherein the temporary access is granted to the user and not granted to the other users of the group.

In a further implementation form of the first, second, and third aspects, the JIT access request further includes a reason for the request to access the target resource, and the analysis is performed according to the reason.

In a further implementation form of the first, second, and third aspects, the JIT access request further includes the time interval for the temporary access to the target resource, and the analysis is performed according to the requested time interval.

In a further implementation form of the first, second, and third aspects, in response to the analysis not meeting the target requirement, a message indicating the JIT access request is sent to another computer for manual review and approval.

In a further implementation form of the first, second, and third aspects, the additional data includes at least one of: additional data about the requesting user, additional data about the target resource, existing access privileges of the user to other resources, role and/or position within an organization, denial or approval of historical access requests, time and/or data of the JIT access request, and geographical location from which the JIT access request is made.

In a further implementation form of the first, second, and third aspects, the additional data is obtained by running a query on an access graph mapping relationships between users and access privileges to different resources.

In a further implementation form of the first, second, and third aspects, the target resources is hosted by an external service computing environment, and the JIT access request is for accessing the external service computing environment via a target service computing environment accessed by the user via a client.

In a further implementation form of the first, second, and third aspects, further comprising: in response to the analysis meeting the target requirement, sending a message to a target service environment hosting the target resource, to set permission granting access to the user to access the target resource.

In a further implementation form of the first, second, and third aspects, further comprising: in response to revoking the access after the defined time interval expired, performing a clean-up on the target service environment hosing the target resource for ensuring there are no left-overs from the temporary access.

In a further implementation form of the first, second, and third aspects, the target resource includes at least one of: a service and/or application provided by an external service computing environment, a file hosted by the external service computing environment, and actions to be performed by the external service computing environment.

According to a fourth aspect, a computer implemented method of managing access for user account, comprising: accessing a graph mapping a plurality of nodes denoting real users to a plurality of user accounts and a plurality of resources hosted by a plurality of service computing environments external to a target computing environment accessed by the user accounts, and defining different permissions for user accounts for accessing the different resources, receiving a query for identifying user accounts for a target user, executing the query on the graph, and providing details regarding user accounts of the target users from the execution of the query on the graph, the details including at least one of: identifiers of the user accounts, resources accessible to the user accounts, access privileges for accessing the resources.

According to a fifth aspect, a system for managing access for user account, comprises: at least one processor executing a code for: accessing a graph mapping a plurality of nodes denoting real users to a plurality of user accounts and a plurality of resources hosted by a plurality of service computing environments external to a target computing environment accessed by the user accounts, and defining different permissions for user accounts for accessing the different resources, receiving a query for identifying user accounts for a target user, executing the query on the graph, and providing details regarding user accounts of the target users from the execution of the query on the graph, the details including at least one of: identifiers of the user accounts, resources accessible to the user accounts, access privileges for accessing the resources.

According to a sixth aspect, a non-transitory medium storing program instructions for managing access for user account, comprising program instructions which when executed by at least one processor, cause the at least one processor to: access a graph mapping a plurality of nodes denoting real users to a plurality of user accounts and a plurality of resources hosted by a plurality of service computing environments external to a target computing environment accessed by the user accounts, and defining different permissions for user accounts for accessing the different resources, receive a query for identifying user accounts for a target user, execute the query on the graph, and provide details regarding user accounts of the target users from the execution of the query on the graph, the details including at least one of: identifiers of the user accounts, resources accessible to the user accounts, access privileges for accessing the resources.

In a further implementation form of the fourth, fifth, and sixth aspects, the graph further includes metadata of the plurality of real users, including roles.

In a further implementation form of the fourth, fifth, and sixth aspects, further comprising automatically analyzing the structure of the graph to identify at least one substructure indicating a security risk, and providing an indication of the security risk represented by the identified at least one sub-structure.

In a further implementation form of the fourth, fifth, and sixth aspects, further comprising automatically adapting the identified at least one sub-structure indicating the security risk to an adapted at least one sub-structure with reduced or eliminated security risk.

In a further implementation form of the fourth, fifth, and sixth aspects, the identified at least one sub-structure indicating the security risk is selected from: a sub-structure indicating access to secrets, a sub-structure indicating permanent access of a user account to a target resource, a sub-structure indicating indirect access, and service accounts with passwords that have not been converted to a private key.

In a further implementation form of the fourth, fifth, and sixth aspects, further comprising: receiving a second query for identifying user accounts with access privileges to a target resource, executing the second query on the graph, and providing the user accounts.

In a further implementation form of the fourth, fifth, and sixth aspects, a single real human user may be associated with a plurality of user accounts, wherein the plurality of user accounts associated with each individual real human user are obtained in response to execution of the query.

In a further implementation form of the fourth, fifth, and sixth aspects, the graph defines membership of users in groups, wherein the user accounts obtained in response to the execution of the query include resources accessible to members of the group.

In a further implementation form of the fourth, fifth, and sixth aspects, the graph includes secret accesses accessible to each user, wherein the details obtained in response to the execution of the query include the secret accesses.

In a further implementation form of the fourth, fifth, and sixth aspects, the graph includes indirect access by a user account to a target resource, wherein the indirect access is performed by a first user account accessing a first target resource, obtaining a second user account of the first target resources, and accessing a second target resource from the first target resource using the second user account, wherein the details obtained in response to the query include the indirect access.

In a further implementation form of the fourth, fifth, and sixth aspects, further comprising automatically creating the graph based on data collected by a discovery process for discovering access permissions of a plurality of user accounts of a plurality of users using a target computing environment, for accessing a plurality of resources hosted by a plurality of service computing environments external to the target computing environment.

In a further implementation form of the fourth, fifth, and sixth aspects, the discovery process includes: adding a connector to a connector interface hosting a plurality of connectors to a plurality of different external systems providing a plurality of different third-party services to a computing cloud used by the plurality of users, wherein the connector is set for integrating with an external system via application programming interface (API) requests, wherein each connector is used to discover an environment of a corresponding external system, wherein each connector is per external system, sending API requests to the external system via the connector, the API requests are for obtaining data regarding access to at least one third-party service hosted by the external system, retrieving API responses from the external system via the connector, transforming the API responses into connector response schemas, wherein the connector response schemas map between data of the external system provided in the API responses and Identity and Access Management (IAM) messages, and creating the graph based on the IAM messages.

In a further implementation form of the fourth, fifth, and sixth aspects, further comprising: creating the connector response schema as a new connector response schema in a tenant service of the computing cloud, the new connector response schema for communicating with the external system, and implementing the API for communicating with the external system.

In a further implementation form of the fourth, fifth, and sixth aspects, the connector interface defines implementations of the plurality of connectors, including existing connectors and future connectors.

In a further implementation form of the fourth, fifth, and sixth aspects, the connector interface is generic, designed to accommodate a plurality of different connector implementations, and the connector response schemas are generic, applicable to a plurality of different external systems.

In a further implementation form of the fourth, fifth, and sixth aspects, the plurality of connectors are run in parallel.

In a further implementation form of the fourth, fifth, and sixth aspects, a process for triggering the discovery service is handled by an independent service storing information of a last run for each tenant and connector, and publishes messages to trigger the runs.

In a further implementation form of the fourth, fifth, and sixth aspects, each connector is an implementation of the connector interface.

In a further implementation form of the fourth, fifth, and sixth aspects, the connector response schemas are defined schemas that specify output of each respective external system for being transformed into the IAM messages.

In a further implementation form of the fourth, fifth, and sixth aspects, each connector includes a constructor that receives a configuration of a certain external system as input from a corresponding tenant configuration.

In a further implementation form of the fourth, fifth, and sixth aspects, further comprising: identifying a login event denoting an access path by a user connecting from a source system to a target resource, and updating the graph by adding the login event to a current version of the graph, wherein the graph defines one or more access paths for each of the plurality of users, wherein at least one user is associated with two or more access paths to the same resource.

In a further implementation form of the fourth, fifth, and sixth aspects, the login event is further identified by: identifying a unique identifier of a target computing environment used by a user logged in to gain access to the target resource, identifying a source actor comprising a logical identity of the user that performed an authentication to the target computing environment, identifying a unique identifier of the target resource, and identifying a target actor within the target resource linked to the source actor.

In a further implementation form of the fourth, fifth, and sixth aspects, further comprising running a third query on the graph for searching for at least one access path according to at least one of: a user, a source system, an actor, and a target system, and providing the at least one access path.

In a further implementation form of the fourth, fifth, and sixth aspects, each graph of a plurality of graphs is created for a single tenant of a plurality of tenants, wherein each graph is logically isolated from other graphs according to tenants.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
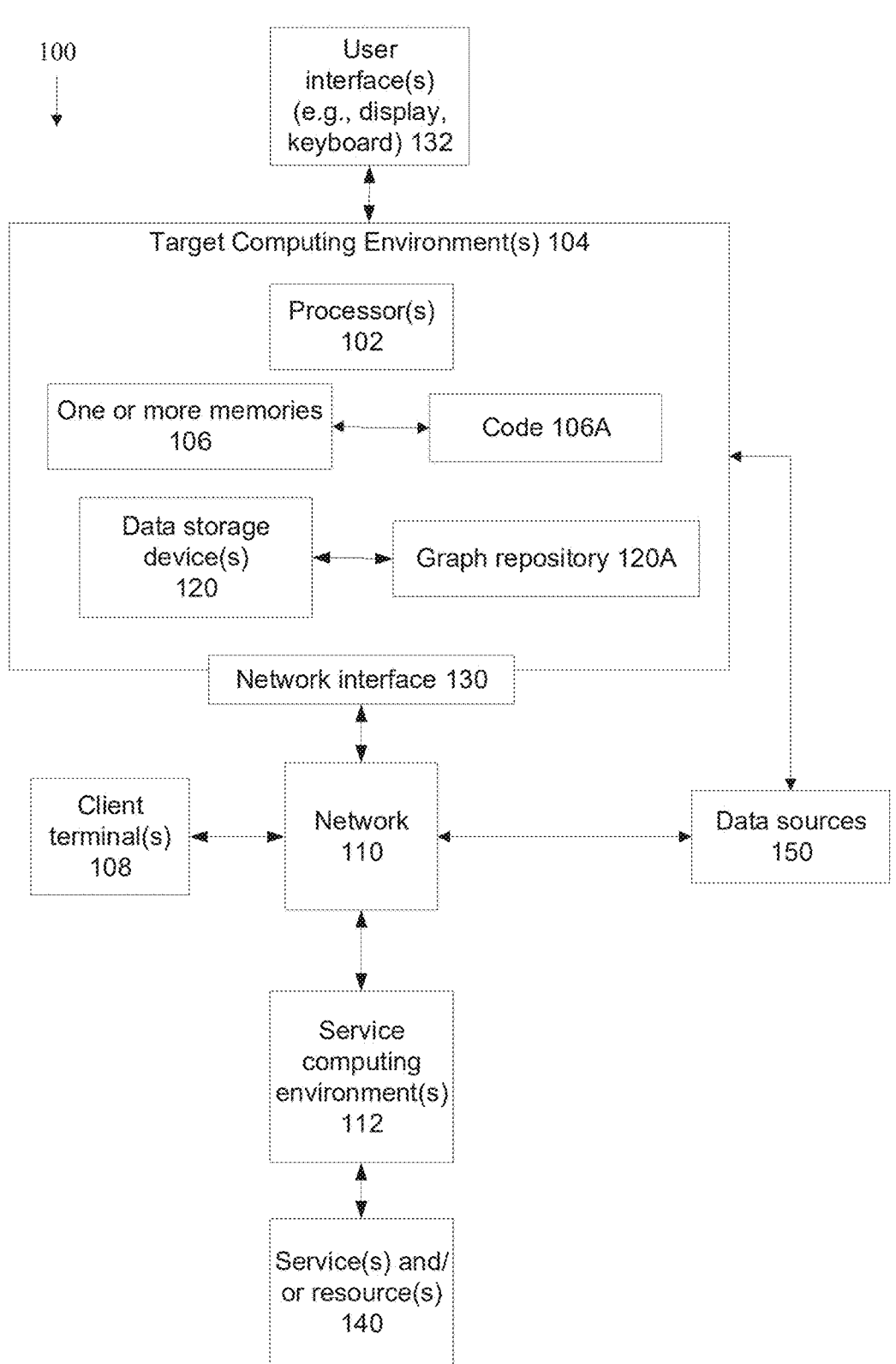
FIG. 1 is a block diagram of components of a system for managing access for user accounts based on a graph and/or for managing adaptive just-in-time (JIT) access requests, in accordance with some embodiments of the present invention.

The present invention, in some embodiments thereof, relates to access management and, more specifically, but not exclusively, to systems and methods for managing access of users to resources.

As used herein, the terms resources and services may be interchanged. Use of one term does not necessarily imply exclusion of the other term. Rather use of a first term may refer to the second term in addition to the first term, or as an alternative to the first term.

An aspect of some embodiments of the present invention relates to systems, methods, computing devices, and/or code instructions (stored on a data storage device and executable by one or more processors) for managing access for user accounts of a network based on a graph. The graph maps nodes denoting real users to user accounts and to resources hosted by service computing environments external to a target computing environment accessed by the user accounts. The graph defines different permissions for user accounts for accessing the different resources. A query for identifying user accounts for a target user is received. The query is executed on the graph. Details regarding user accounts of the target users are obtained from the execution of the query on the graph. The details include one or more of: identifiers of the user accounts, resources accessible to the user accounts, and access privileges for accessing the resources.

An aspect of some embodiments of the present invention relates to systems, methods, computing devices, and/or code instructions (stored on a data storage device and executable by one or more processors) for managing adaptive just-in-time (JIT) access requests. A JIT access request is received. The JIT access request includes an identity of a user making the request, and a target resource to which access is requested. Additional data associated with the identity of the user is automatically accessed. The JIT access request is automatically analyzed in view of the additional data. In response to the analysis meeting a target requirement, temporary access to the user to access the target resource for a defined time interval may be automatically granted. The temporary access is automatically revoked in response to expiration of the defined time interval.

It is to be understood that reference to resources hosted externally to the target computing environment (accessed by the user accounts), such as by service computing environments, represents an exemplary and not necessarily limiting implementation. The resources may be hosted by the target computing environment (e.g., on-premises), for example, the resource may require a higher access level in order to be accessed by user accounts of the target computing environment. The higher access level may be granted and/or controlled using one or more embodiments described herein.

At least one embodiment described herein addresses the technical problem of managing access of users (e.g., real users, user accounts, automated users) to resources, which may be hosted externally to a target computing environment (used by the users) such as by one or more service computing environments. At least one embodiment described herein improves the technology of managing access of users to resources, which may be hosted externally to a target computing environment such as by one or more service computing environments. At least one embodiment described herein improves upon prior approaches for managing access of users to resources, which may be hosted externally to a target computing environment such as by one or more service computing environments. At least one embodiment described herein provides one or more practical applications of managing access of users to resources, which may be hosted externally to a target computing environment such as by one or more service computing environments.

At least embodiment addressed the aforementioned technical problem(s), and/or improves the aforementioned technical field(s), and/or improves the aforementioned technical approach (cs), by using a that graph maps nodes denoting real users to user accounts and to resources hosted by service computing environments external to a target computing environment accessed by the user accounts. The graph defines different permissions for user accounts for accessing the different resources. A query for identifying user accounts for a target user is received. The query is executed on the graph. Details regarding user accounts of the target users are obtained from the execution of the query on the graph. The details include one or more of: identifiers of the user accounts, resources accessible to the user accounts, and access privileges for accessing the resources. The practical application(s) may include automatically analyzing the structure of the graph to identify at least one sub-structure indicating a security risk. Automated action may be taken according to reduce the identified security risk. For example, by providing an indication of the security risk represented by the identified at least one sub-structure. In another example, the identified sub-structure(s) indicating the security risk may be automatically adapted to an adapted sub-structure(s) with reduced or eliminated security risk.

At least embodiment addressed the aforementioned technical problem(s), and/or improves the aforementioned technical field(s), and/or improves the aforementioned technical approach(es), by using adaptive just-in-time access requests. The JIT access request includes an identity of a user making the request, and a target resource to which access is requested. Additional data associated with the identity of the user is automatically accessed. The JIT access request is automatically analyzed in view of the additional data. In response to the analysis meeting a target requirement, temporary access to the user to access the target resource for a defined time interval may be automatically granted. The temporary access is automatically revoked in response to expiration of the defined time interval.

The JIT access request, which automatically grants access for a limited time to a specific user to a specific resource (and then automatically revokes the access) is different than standard approaches, where access is manually granted by administrator for undefined amounts of time. Such manual approach where users are granted access without a defined time limit are prone to error, security breaches, and are time consuming and difficult to manage especially in large networks with many users accessing many different resources.

At least one embodiment described herein addresses the technical problem of creating the graph. The graph may be created using one or more connectors that connect between the target computing environment (from which the users use for access) to the service computing environments (which host the services the users are accessing). The connectors may be used for obtaining information from the service computing environments for generating the graph, for example, access patterns of users to services hosted by the corresponding service computing environment. Using existing approaches, developing a new connector requires significant effort, including creating a new service, new proto messages, and making various code adjustments.

Given the need to quickly develop new connectors, at least one embodiment described herein relating to a "discovery service" is designed to reduce the time required for the process of generating new connectors. The discovery service may represent a generic service that unifies all connectors under a common interface. This approach is designed to minimize the developer's time needed to implement new connectors. With this service in place, adding a new connector may be performed by:

Creating a schema configuration in the tenants' service.
Implementing the API for the third party
Transforming the response to a pre-defined schemas.
At least one embodiment described herein relates to:
Streamlining and/or automated access management workflows, enabling entities to manage and/or oversee permissions (i.e., access permission for users to access one or more services). The privileges lifecycle management may be streamlined by handling the provisioning and/or de-provisioning of users and/or privileges.

Ensuring that human and/or machine (i.e., automated, machine learning based, artificial intelligence based) accounts hold only the privileges they need, and only when they need them.

Designed for needs across fragmented hybrid environments.

Simplifying what is traditionally a complex, manual process, into an agentless, streamlined operation that increases security while minimizing friction for administrators and/or uses. Easy implementation designed to take minutes and/or intuitive maintenance, delivering fast value efficiently.

Exemplary use cases of at least one embodiment described herein include:

Recertification and Audit Preparation: regulatory compliance tracking, identify non-compliant privileges, regular recertification, risk-assessed access requests, and automated approval processes.

Joiners, Movers, Leavers: birthright privilege detection, automated provisioning/deprovisioning, HRIS integration, streamlined access requests, dynamic permission recalibration.

Risk Reduction: cross-directory visibility, security hygiene (e.g., MFA), real-time privilege analysis, threat detection alerts, detect unused privileges.

Privileges Elevation—task-specific privilege granting, risk-reducing approval workflows, maintains business continuity and user experience, just-in-time, just-enough privilege elevation.

Non-Employee Access Management—automated temporary privilege provisioning, self-service permission requests, streamlined approval automations, continuous review and recertification.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
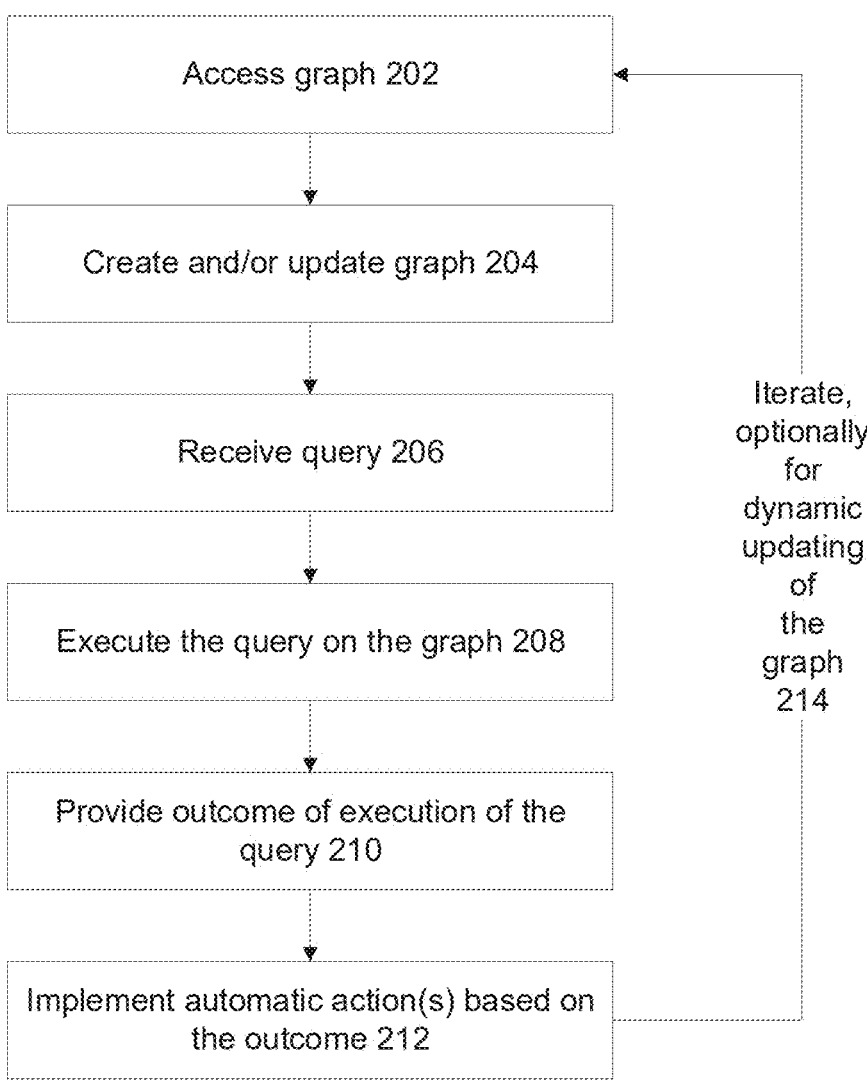
FIG. 2 is a flowchart of a method of managing access for user accounts based on a graph, in accordance with some embodiments of the present invention.
Figure 3:
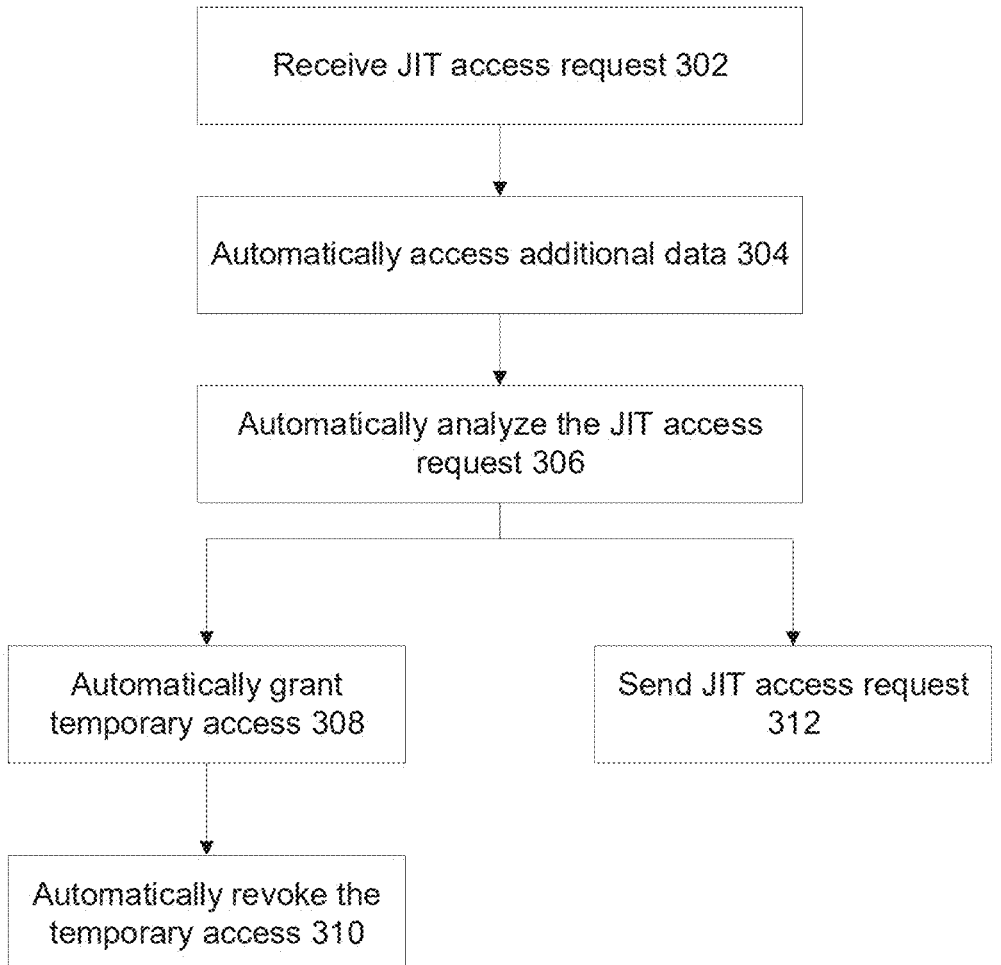
FIG. 3 is a flowchart of a method of managing adaptive just-in-time access requests, in accordance with some embodiments of the present invention.
Figure 4:
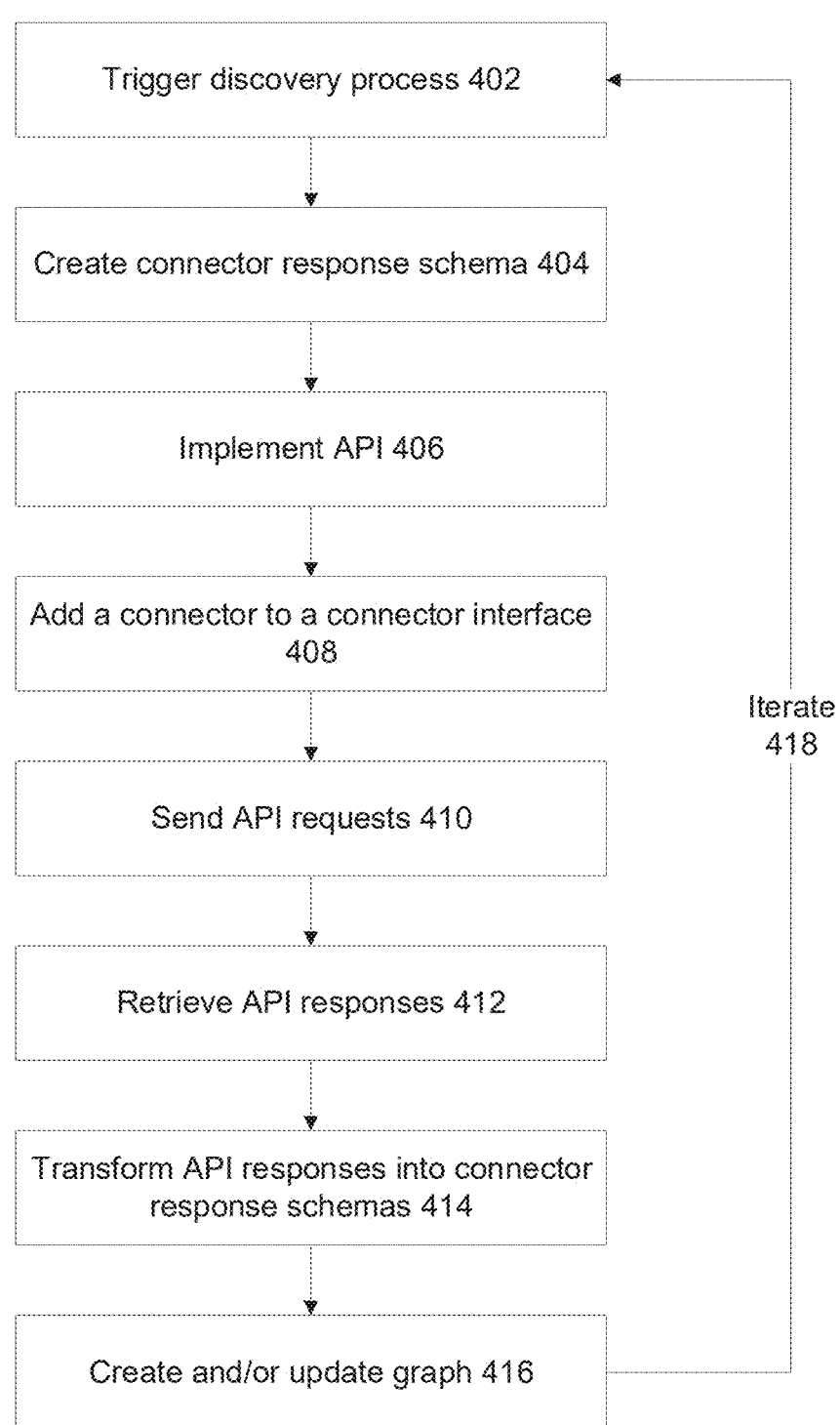
FIG. 4 is a flowchart of an exemplary method for implementing a discovery process, in accordance with some embodiments of the present invention.
Figure 5:
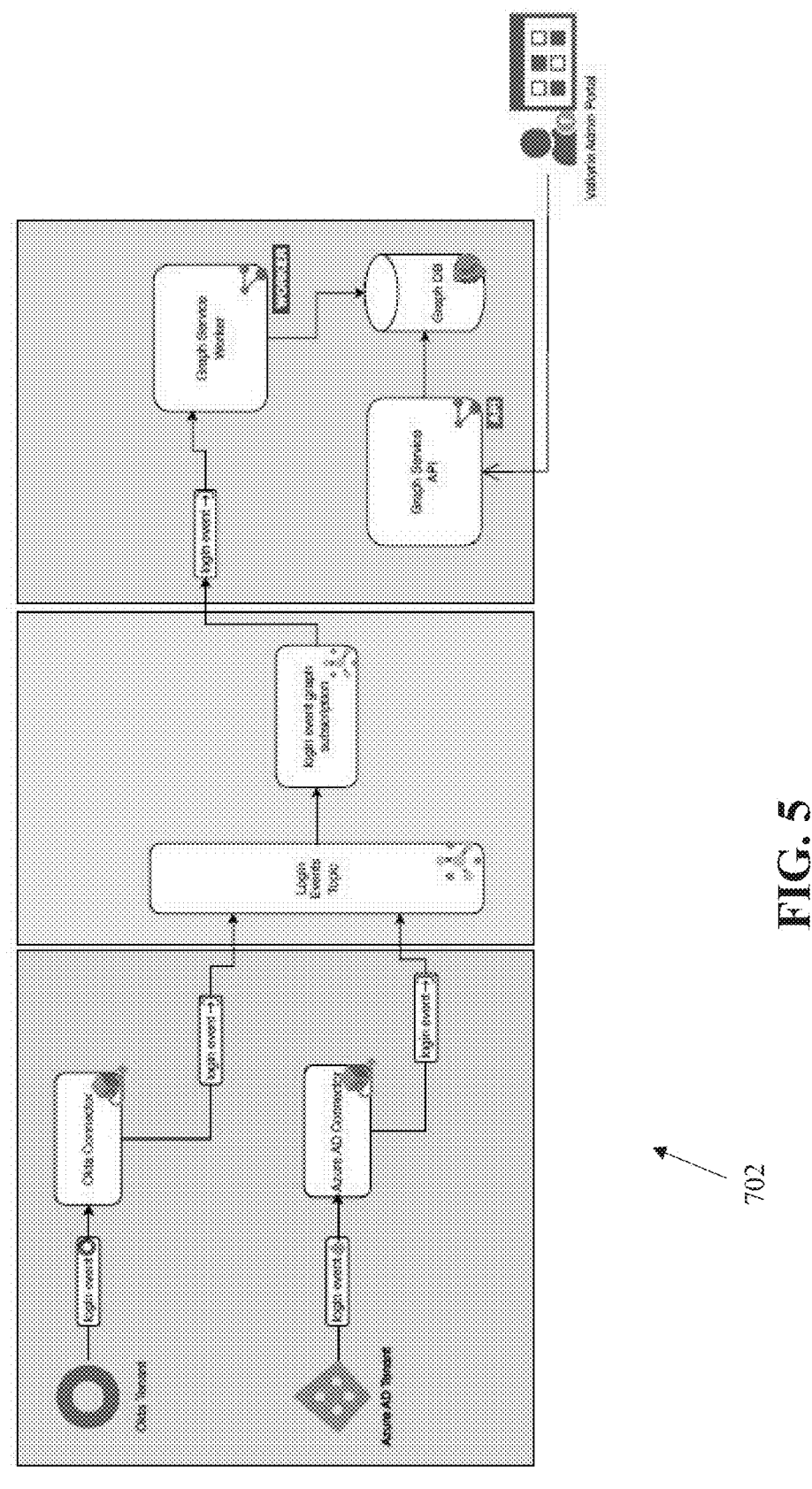
FIG. 5 is schematic of an exemplary high-level architecture for creating and/or implementing a graph, in accordance with some embodiments of the present invention.
Figure 6:
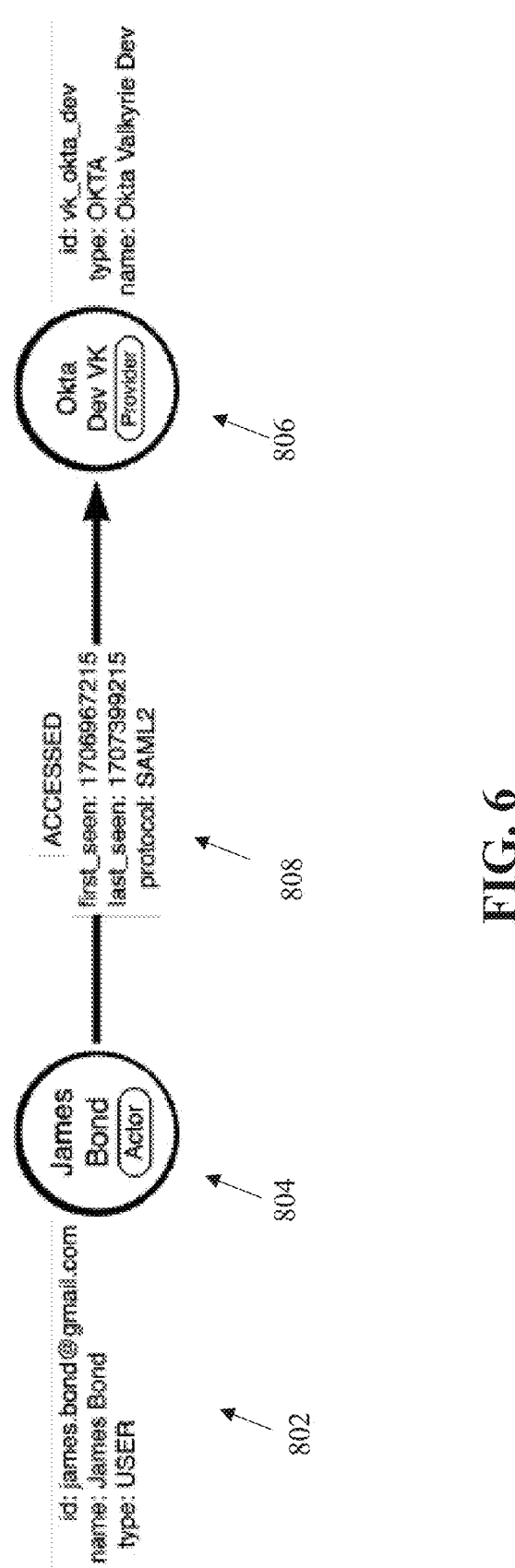
FIG. 6 is a schematic of a simple graph, in accordance with some embodiments of the present invention.
Figure 7:
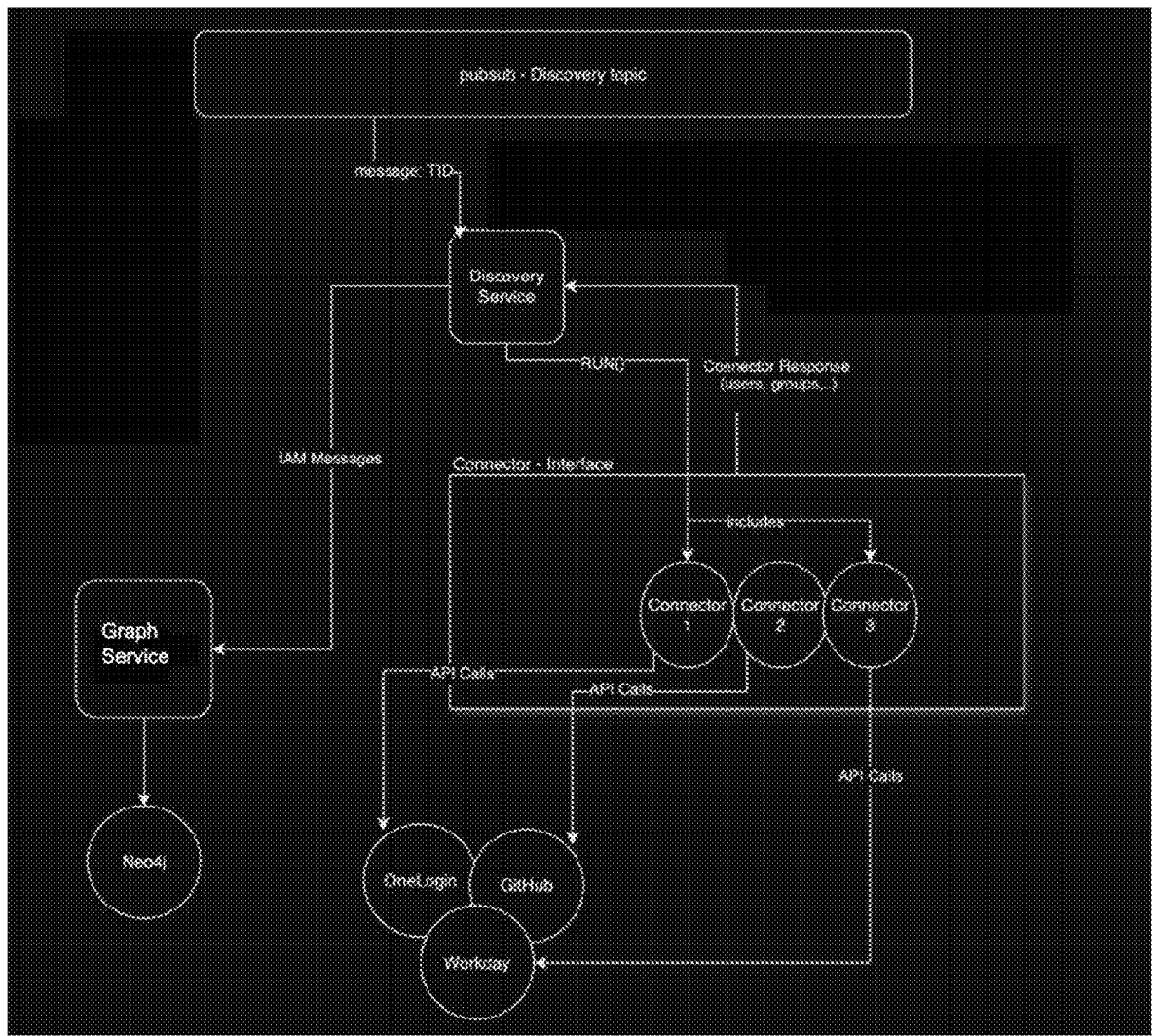
FIG. 7 is a schematic of an exemplary dataflow for obtaining IAM messages from each connector using the discovery service, in accordance with some embodiments described herein.
Figure 8:
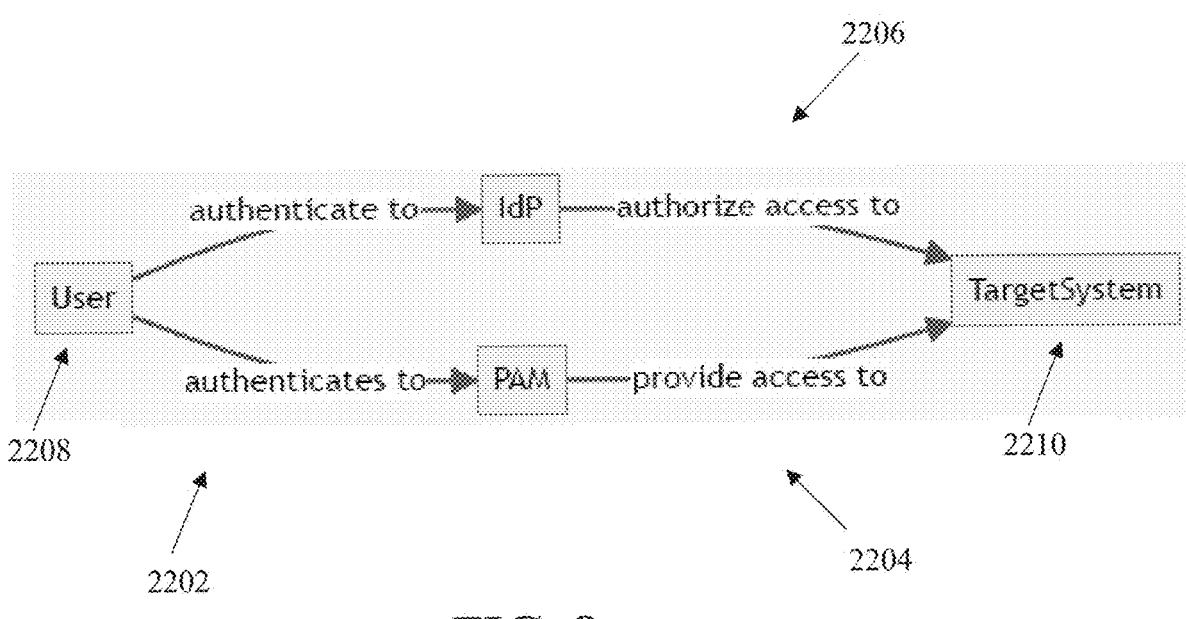
FIG. 8 is a schematic of an exemplary privileged access graph that shows 2 different privileged access paths to the same target system, in accordance with some embodiments of the present invention.
Figure 9:
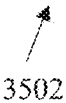
FIG. 9 is a sequence diagram for processing a JIT access request, in accordance with some embodiments of the present invention.
Figure 10:
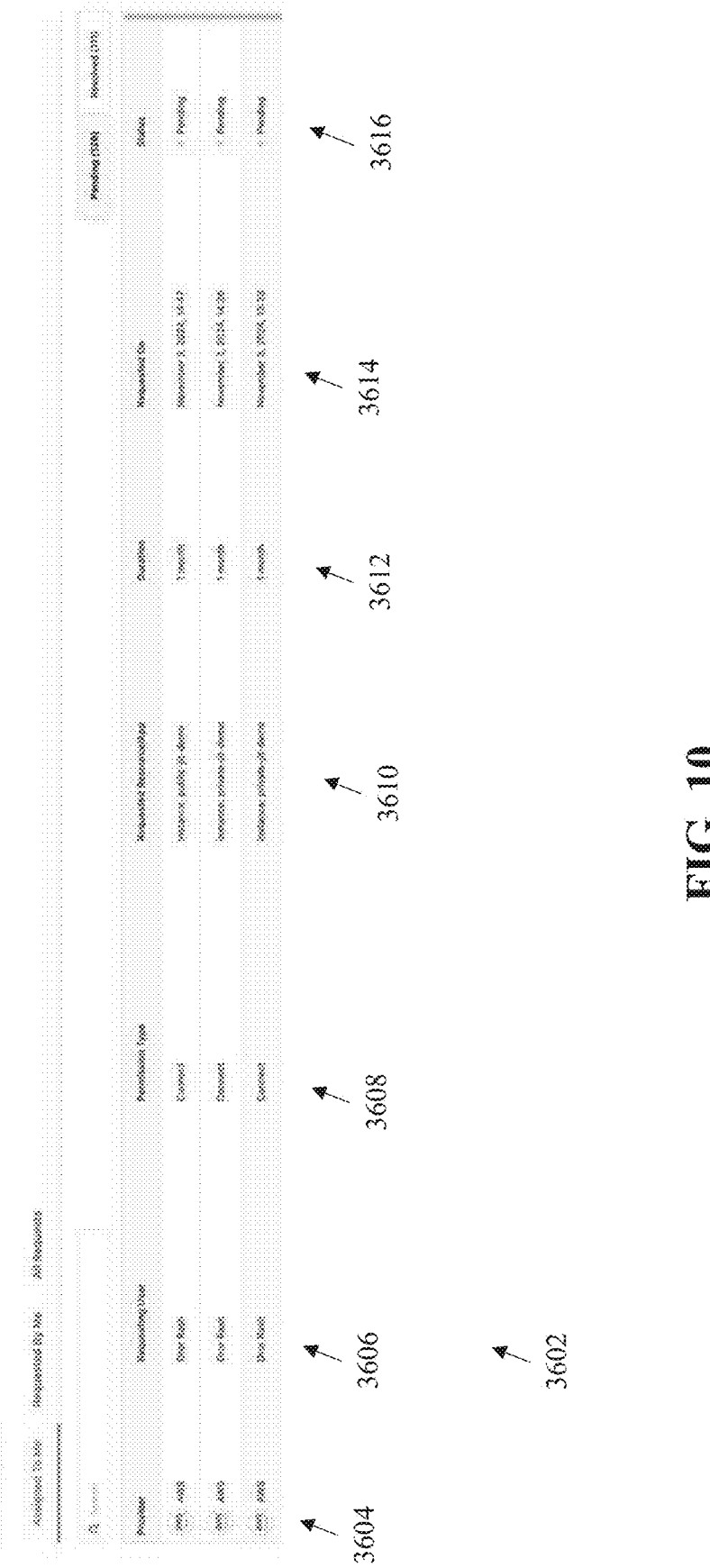
FIG. 10 is an exemplary presentation of JIT access requests, optionally within a GUI, in accordance with some embodiments of the present invention.

Reference is now made to FIG. 1, which is a block diagram of components of a system for managing access for user accounts based on a graph and/or for managing adaptive just-in-time (JIT) access requests, in accordance with some embodiments of the present invention. Reference is also made to FIG. 2, which is a flowchart of a method of managing access for user accounts based on a graph, in accordance with some embodiments of the present invention. Reference is also made to FIG. 3, which is a flowchart of a method of managing adaptive just-in-time access requests, in accordance with some embodiments of the present invention. Reference is also made to FIG. 4, which is a flowchart of an exemplary method for implementing a discovery process, in accordance with some embodiments of the present invention. Reference is also made to FIG. 5, which is schematic of an exemplary high-level architecture for creating and/or implementing a graph, in accordance with some embodiments of the present invention. Reference is also made to FIG. 6, which is a schematic of a simple graph, in accordance with some embodiments of the present invention. Reference is also made to FIG. 7, which is a schematic of an exemplary dataflow for obtaining IAM messages from each connector using the discovery service, in accordance with some embodiments described herein. Reference is also made to FIG. 8, which is a schematic of an exemplary privileged access graph that shows 2 different privileged access paths to the same target system, in accordance with some embodiments of the present invention. Reference is also made to FIG. 9, which is a sequence diagram for processing a JIT access request, in accordance with some embodiments of the present invention. Reference is also made to FIG. 10, which is an exemplary presentation of JIT access requests, optionally within a GUI, in accordance with some embodiments of the present invention.

Referring now back to FIG. 1, a system 100 may implement the acts of the method described, for example with reference to FIGS. 2-4, by processor(s) 102 of a target computing environment 104 executing code instructions 106A stored in a memory 106 (also referred to as a program store).

Target computing environment 104 may be implemented as, for example one or more and/or combination of: a computing cloud, a group of connected devices, a server, a virtual server, an administrative server, a network component (e.g., router, access manager, firewall), a client terminal, a virtual machine, a desktop computer, a thin client, a network node, and/or a mobile device (e.g., a Smartphone, a Tablet computer, a laptop computer, a wearable computer, glasses computer, and a watch computer).

Target computing environment 104 may generate one or more graphs (hosted in a graph repository 120A mapping real users to user accounts and/or resources, and defining permissions for the user accounts for accessing the resources, and/or for executing a query on the graph for identifying user accounts for a target user, as described herein. Alternatively or additionally, target computing environment 104 may automatically grant target access to a user to access a target resource requested in a JIT access request.

One or more client terminals 108 access target computing environment 104 using respective user identities, optionally via network 110. The client terminals 108 may access one or more services and/or resources 140 hosted by one or more service computing environments 112 112B via target computing environment 104 using their respective identities. In some embodiments, one or more services and/or resources 140 may be hosted by target computing environment 104.

Service computing environment(s) 112A may provide one or more services and/or resources 140 to the client terminals 108 accessing target computing environment 104, for example, email services, data storage services, software as a service (SaaS), and the like. Service computing environments 112 may be implemented as, for example, servers, web servers, computing clouds, virtual servers, and the like.

Processor(s) 102 of target computing environment 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described, for example with reference to FIGS. 2-4, when executed by processor(s) 102.

Target computing environment 104 may include a data storage device 120 for storing data, for example, a graph repository 120A set to store different graphs, created and/or used as described herein. Data storage device 120 may be implemented as, for example, a memory, a local hard-drive, virtual storage, a removable storage unit, an optical disk, a storage device, and/or as a remote server and/or computing cloud (e.g., accessed using a network connection).

Computing environment 104 may include a network interface 130 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Network 110 may be implemented as, for example, the internet, a local area network, a virtual network, a wireless network, a cellular network, a local bus, a point to point link (e.g., wired), and/or combinations of the aforementioned.

Computing environment 104 may access one or more data sources 150, via network 110 and/or which may be locally hosted (e.g., by data storage device(s) 120). Examples of data sources 150 include, for example, a database hosting identifiers of users, access permissions, authorized services and/or resources, and the like.

Target computing environment 104 and/or client terminals 108 may include and/or may be in communication with one or more physical user interfaces 132 that include a mechanism for a user to enter data and/or view data. Exemplary user interfaces 132 include, for example, one or more of, a touchscreen, a display, a virtual reality display (e.g., headset), gesture activation devices, a keyboard, a mouse, and voice activated software using speakers and microphone.

Referring now back to FIG. 2, at 202, a graph may be accessed.

The graph includes nodes connected by edges.

The graph map nodes denoting real users, to accounts, optionally user accounts, and/or services and/or resources hosted by service computing environments. The service computing environments are external to a target computing environment which is used by the user accounts for accessing the external services and/or resources hosted by the service computing environments. The graph includes definitions of different permissions for user accounts for accessing the different services and/or resources. The graph may further include metadata of the real users, for example, including roles.

The account be of an authorized entity (e.g., human user, robot, AI model) that is associated with specific defined permissions.

The graph may define privileged accounts, in addition to non-privileged user accounts. Alternatively, the graph may define privileged accounts while excluding non-privileged accounts.

A privileged account may be an account (usually a user account) that is given elevated permissions on some system beyond those of a standard user, for example, to access specific resources and/or perform elevated actions, such as in order to perform administrative operations. Privileged accounts may represent a higher security risk than standard access accounts, since users with privileged accounts may be able to cause most damage to important data and/or processes.

The graph may further define membership of users in groups. In such implementation, user accounts obtained in response to the execution of a query on the graph (as described herein) include resources accessible to members of the group.

The graph may define secret accesses accessible to each user. In such implementation, details obtained in response to the execution of the query on the graph (as described herein) include the secret accesses.

It is noted that the resource and/or service which is being accessed by users is not necessarily a final destination. The graph may depict that that access a target resource that might be used to connect to other systems and/or to the resource and/or service. The graph may define indirect access by a user account to a target resource. The indirect access may be performed by a first user account accessing a first target resource, obtaining a second user account of the first target resources, and accessing a second target resource from the first target resource using the second user account. In such implementation, the details obtained in response to the query include the indirect access.

Access to the graph database may be designed to work with a database cluster deployment.

An example of a simple graph which may be presented on a display and/or queried is now described. The graph may represent two users with access to connect to a shared snowflake user using their personal OKTA accounts with SAML2. The graph may indicate that a snowflake Org is not directly accessed by the two users, but rather indirectly via the OKTA accounts and a shared snowflake user.

Referring now back to FIG. 5, a schematic of an exemplary high-level architecture 702 for creating and/or implementing a graph, is presented. Architecture 702 may include one or more of the following components: connectors and login events, identity discovery events, graph service and database, and pub/sub facilities (e.g., topics and subscriptions)

Referring now back to FIG. 2 at 204, the graph may be created (when no current graph exists) and/or updated (when a current graph exists). It is noted that the graph may be created prior to being accessed.

Multiple graphs may be created. Each graph may be created for a single tenant of multiple tenants. Each graph may be logically isolated from other graphs according to tenants. A database storing the graph may include entities from multiple tenants. Given that in some implementations each entity is associated with a single tenant, a clear separation between entities in different tenants is generated. Exemplary approaches are now described for separation of tenants.

In a first exemplary approach, where the graph is implemented using neo4j (e.g., v4), a fully isolated database may be generated per tenant. In another exemplary approach, a tenant prefix is used, for example, a tenant id is added as a prefix to each entity in the graph (e.g., node labels and/or relationships types associated with edges) or alternatively adding the tenant id as a property to each entity in the graph. This layer may be used across all applications that can access the graph. It is noted that cypher query examples described herein do not include the tenant prefix, in order to simplify The graph may be automatically created and/or updated based on detected login events, which may be obtained, for example, using a dedicated topic subscription.

To represent the login information, for example for the OKTA IdP use case, the login event that occurred when a login happened is obtained, for example, to snowflake using OKTA with SAML2.

The following information may be detected and used to create the graph:

Login detection—the login event requires a detection process. Information associated with the login event used for constructing a specific access path is obtained.

Identify the source system—the source system is the one the user logged in to in order to gain access to the target system (i.e., target resource). The unique identifier of the source system and optionally the type of the source system (e.g., OKTA) may be obtained.

Identify the actor—the actor is the user that performed the authentication to the source system (e.g., OKTA). At the very basic level the unique username of the user within the system is identified. The actor may be enriched with additional information.

Identify the target system—the target system is identified in order to draw the connection with the source. The target system is unique identified and optionally the type of the target system is identified (e.g., SNOW-FLAKE).

Identify the target actor—the target actor is identified in order to draw the connection with the source actor. The actor within the target system is uniquely identified.

The login event may be an input for creating the graph. The login event may be used to construct a relationship (i.e., a graph edge) between 2 systems (i.e., graph nodes). The login event message may be represented as a protobuf message.

Login events may be produced by components referred to herein as connectors. The connectors may integrate with a specific provider (e.g., OKTA, Snowflake etc.) to obtain the provider-specific login event message (for example, you can see OKTA login event), which may be normalized to the login event used to create the graph. Connectors may be created by a discovery process, described below in additional detail.

While the login event messages may be used to build the actors and providers and their relationships in the graph (as described herein), they may not necessarily provide information on the relationship between actors and their identity. Such information may be provided by a different message referred to herein as identity association which may be produced by an identity service.

Exemplary main details described by the identity association message include:

The actor ID—the actor ID is a unique identifier of an actor as described herein.

The discovered identity—the identity that was discovered to match the specified actor, for it contains a unique ID as optionally a name.

Connectors may produce login events and those login events may be published to a dedicated login_events pub/sub topic. The graph service may pull those messages from the topic using a dedicated pub/sub subscription (this allows other components to pull the same login events and perform different processing operations on them). The graph service may process the login events to construct or update a graph entry and persist it in the graph (e.g., implemented as a neo4j database). An entry may be defined as a connection between 2 systems, i.e., an edge between two nodes.

In an exemplary implementation, the graph service may include 3 components: Graph DB (e.g., implemented using neo4j), a Graph Worker process, and a Graph API.

With respect to the graph DB (neo4j), neo4j is a native graph database, it provide the ability to model data as a graph. The graph may include one or more of the following entities:

Nodes (vertices)—a node in a graph entity includes a label(s) indicating a classification of the node. A node may have multiple properties associated with it and/or may be associated with one or multiple relationships with other nodes in the graph.

Relationships (edges)—a relationship is a graph entity that has a single type. An edge may include one or multiple properties associated with it. An edge may refer to a "connection" between 2 nodes in the graph.

Labels—labels may be associated with nodes, optionally for providing grouping and/or classifications for nodes.

Properties—properties may be implemented for example as key-value pairs used for storing data on graph nodes or relationships.

In examples shown herein, labels may be camel case and capitalized (i.e., start with a capital letter), e.g., Actor, User, AdminAccount etc. Relationship types may be in upper case separated by underscores, e.g., ASSOCIATED_WITH, LOGGED_IN_WITH etc. Properties can be either camel case (e.g., firstSeen) or snake case (e.g., first_seen).

Referring now back to FIG. 6, a simple graph 802 is shown, that includes:

A James Bond node 804 with an Actor label and the id, name and type properties.

An Okta Dev VK node 806 with a Provider label and the id, type and name properties.

An ACCESSED relationship 808, connecting the James Bond node 804 and the Okta Dev VK node 806, which also includes properties that provide additional information about the relationship.

Referring now back to 204 of FIG. 2, a node of the graph may be associated with an identity. An actor may be associated with a single identity (for example, a shared service account). Examples of actors include: a user account in Okta, a service account in AWS, and a user account in Snowflake. A provider label may represent a system. A provider may be associated with multiple actors. Examples of provides include: Okta, Snowflake, and Azure AD.

In some embodiments, a node in the graph may be associated with a single label. A node property may be defined according to its label. Examples of identity node properties include: id, email, phone_number, ssn, display-_name, first_seen, and last_seen. Examples of provider node properties include: id, account_id, and type. Examples of actor node properties include: id, provider_id, username, first_seen, and last_seen. It is noted that first_seen and last_seen may be represented as UNIX epoch timestamps (i.e., seconds since UNIX epoch).

The graph may be automatically created based on data collected by the connectors as part of the discovery process. The discovery process is designed for discovering access permissions of user accounts of multiple users using the target computing environment for accessing resources hosted by one or more service computing environments external to the target computing environment.

The data included in the graph may be after a defined date.

Referring now back to FIG. 4, the discovery process may be implemented, for example, in a cloud environment (e.g., implementation of the target computing environment) with multiple tenants. The discovery process may be executed for each tenant, for creating a different graph for each tenant.

The discovery process (also referred to herein as a Discovery Service) may manage and/or handle connector runs (optionally excluding those implemented withCloudQuery) used to discover a customer's environment (e.g., Users, Groups, Resources, Applications, etc.). The output of the discovery service is IAM messages, which may be published to the IAMmessages topic and consumed by a Graph Worker for generating the graph.

The main functionality of a connector may be to integrate with a third-party provider to retrieve data such as Users, Groups, Permissions, Applications, and Roles. The output of a connector run may be Connector Response Schemas. The Connector Response Schemas may be implemented as well-defined schemas that specify the output of Connectors, which will be transformed into IAM messages as part of the Discovery Service flow. The connector may performs two main actions:

1. Integrates with a third-party provider via API requests.
2. Transforms API responses into Connector Response Schemas.

The main components of the discovery process may include:

1. Discovery Service: The discovery service itself.
2. Connector Interface: A generic interface that defines all future connector implementations.
3. Connector Response Schemas: Schemas used to map between each external service and/or resource and IAM messages.
4. Discovery Service Triggering Process: The process that may define how to trigger the discovery service and/or the execution of connectors.

At 402, the discovery process may be automatically triggered.

A process for automatically triggering the discovery service may be handled by an independent service. The independent service may store information of a last run for each tenant and/or connector. The independent service may and publish messages to trigger the runs by the discovery service.

At 404, a connector response schema may be created as a new connector response schema in a tenant service of the computing cloud. The new connector response schema is designed for communicating with the external service computing environments (also referred to herein as external systems and/or third-party services).

The connector response schemas are defined schemas that specify output of each respective external system for being transformed into Identity and Access Management (IAM) messages which are used to generate the graph.

At 406, an application programming interface (API) or other virtual interface may be implemented for communicating with the external system.

At 408, a connector is automatically added to a connector interface hosting multiple connectors to multiple different external systems providing different third-party services and/or resources to the computing cloud used by different users. Adding the new connector to the Discovery Service may be a quick and/or straightforward task.

The connector may be a component of the discovery service.

The connector interface may define a connector's functionality.

Each connector may be used to discover an environment of a corresponding external system.

Each connector may be implemented per external system.

The multiple connectors may be run in parallel, optionally including other features described herein such as conversion and/or message publishing.

The connector interface defines implementations of the connectors, including existing connectors and future connectors.

The connector interface may be generic, designed to accommodate multiple different connector implementations. The connector response schemas may be generic, applicable to multiple different external systems. The connector interface may be generic, designed to accommodate future connector implementations, of different types and/or to different external systems.

The connector may be set for integrating with each external system via application programming interface (API) requests.

Each connector may be an implementation of the connector interface.

Each connector may include a constructor that receives a configuration of a certain external system as input from a corresponding tenant configuration.

Optionally, error handling is implemented in response to detecting a failure in a running connector. The error handling is designed to prevent failure of the Discovery Service. Failures may be logged and/or reported.

At 410, API requests are sent to the external system via the connector. The API requests are for obtaining data regarding access to at least one third-party service and/or resource hosted by the external system.

At 412, API responses are retrieved from the external system via the connector.

At 414, the API responses are transformed into connector response schemas.

The connector response schemas may be generic, designed to be application to different external services, i.e., not specific to any one external service.

The connector response schemas map between data of the external system provided in the API responses and the IAM. Messages.

At 416, the graph is created and/or updated based on the IAM messages.

At 418, one or more features described with reference to 402-416 may be iterated. Each iteration may be triggered, for example, as described with reference to 402.

Referring now back to FIG. 7, the schematic depicts the exemplary dataflow 902 for obtaining IAM messages from each connector using the discovery service.

An exemplary implementation of a connector interface may include one or more of the following exemplary fields: users, groups, resources, applications, accounts, organization, permission groups, and permission group association.

An exemplary implementation of a connector response schema may include one or more of the following fields: userstatus representing the unified status options of users, for example, staged (new users created and not activated yet), active status, suspended status, pending user status, locked user status, password reset user status, password expired user status, terminated user status, AccountID denoting a globally unique identifier for the account or organization the user is configured in, UserID denoting the external user ID in the provider (i.e., provider resource identifier), email, attributes, groupID, and the like. It is noted that sometimes the provider does not define a username. In such cases, it will be set to either the login name or a concatenation of the first and last name.

An exemplary implementation of a user group may include one or more of the following fields: accountID, groupID, groupName, description, creation time, update time, members, and attributes. To obtain group association (e.g., Members), additional APIs may be called, depending on the provider.

An exemplary implementation of a resource may include one or more of the following field: accountID, resourceID, resourceName, resourceType, description, ownderID, creation time, update time, and attributes. A resource may be any non-identity component within a provider's account or organization that can be acted upon and is subject to access controls, permissions, and policies. Unlike identities, which are users or groups, resources do not group identities.

An exemplary implementation of an application as an example of a resource, may include one or more of the following fields: accountID, applicationID, applicationName, descriptions, ownerID, creation time, update time, associationID, and attributes. To obtain application associa-
tion (i.e., userIDs or groupIDs) additional APIs may be
called, depending on the provider.

An exemplary implementation of an account may include
one or more of the following fields: accountName, provid-
erType, organizationID, description, ownerID, time of cre-
ation, update time, attributes, organization, organization-
Name, providerType, description, ownerID, time of
creation, time of update, and attributes.

An exemplary implementation of a permission group may
include one or more of the following fields: accountID,
permissionGroupID, permissionGroupName, actions,
negated, time of creation, update time, attributes, and action.

An exemplary implementation of a permission group
association may include one or more of the following fields:
a permissionGroupID, resources, and identityIDs. Permis-
sion group associations may be used to connect identities
(e.g., users or groups) to resources through the permissions
and actions those identities can perform on those resources.

An exemplary implementation of a connector response
schema for generating IAM messages may include one or
more of the following fields: user, group, group users,
application, application association IDs, resource, permis-
sion group, permission group association, account, and
organization. Once connector response schemas returned
from each connector are defined, the translation to each IAM
message may be obtained.

An exemplary implementation of a UUID 1902 to create
a unique identifier for an actor, may include one or more of
the following fields: tentantID, provider, actorusername,
customertenantID, tenantproviderID, and actortenantID. In
order to uniquely identify actors for generating the graph,
each actor may be created and/or defined based on one or
more of the following data: actor username, provider
account ID, and tenant ID. The actor may be a common
entity with a unique ID. The login event may be updated to
use it.

Referring now back to FIG. 2, at 206, a query is received.
The query may include a filter.

The query may be automatically generated such as by
code, and/or manually generated by a user such as a network
administrator.

Optionally, the query is for identifying user accounts for
a target user. The target user may be a real human user.
Alternatively, the target user may be an automated entity, for
example, a machine learning model, an artificial intelligence
agent and the like. The target user may access one or more
user accounts, which may be different user accounts such as
for accessing different services and/or resources. The user
accounts are provided in response to execution of the query
on the graph.

Alternatively or additionally, the query is for identifying
user accounts with access privileges to a target resource. The
access privileges may be of a certain type, for example, high
access. The user accounts are provided in response to
execution of the query on the graph.

Alternatively or additionally, the query is for searching for
one or more access paths according to at least one of: a user,
a source system, an actor, and a target system. An entity
(e.g., administrator) within an organization may be given
privileged access according to its needs (e.g., network
admin, security admin etc.) in order to perform their role
effectively. The access path(s) are provided in response to
execution of the query on the graph. The access paths may
be privileged access paths. Privileged access may refer to the process by which a user uses a privileged account to access
resources and/or services, for example, to perform admin-
istrative operations.

Alternatively or additionally, the query is for applying a
filter, for example, given a list of users in the filter, present-
ing a subset of the graph displaying access paths (e.g.,
privileged access paths) to the target resource for the pro-
vided list of users. In another example, the filter includes a
time range. A subset of the graph presenting access paths
detected within the defined time range may be presented.
Multiple filters may be applied.

Features of the graph, including the query, may be
accessed via a virtual interface, for example, a graph API.
The graph API may expose the functionality of the graph.

Exemplary parameters of a graph API for querying and/or
updating a graph may include one or more of the following
data elements: tenant ID, provider account ID, identity
primary ID, and from.

An example of a query for execution on the graph using
the graph API may include, for example, instruction to
match a path that includes an email, or phone number, or
other ID association with an actor associated with a provider
ID. The graph API may be used to find access paths. It is
noted that the presented query is a full query. In practice
some filters such as the usernames and last_seen are not
necessarily mandatory and will may not necessarily be part
of the query if not requested.

Access paths may be matched using a pattern with rules.

Filters may be applied on path lookup queries.

Referring now back to FIG. 2, at 208, the query is
executed on the graph. The query may be executed, for
example, by a process that traverses the graph's nodes and
edges to retrieve and/or analyze the relevant data stored by
the graph.

When the graph is implemented using neo4j, the query
may be implemented in the cypher language. Cypher queries
may be used to query and/or update the graph.

At 210, an outcome obtained in response to execution of
the query on the graph is obtained. The outcome may be, for
example, presented on a display, forwarded to another
device (e.g., administrative server), stored on a data storage
device (e.g., log file), and/or fed into another process (e.g.,
for automated action, as described herein).

Optionally, the outcome includes details regarding user
accounts of the target users. The details may include, for
example, identifiers of the user accounts, resources acces-
sible to the user accounts, and access privileges for access-
ing the resources.

Alternatively or additionally, the outcome includes one or
more access paths, optionally privileged access paths. Privi-
leged access paths may represent higher security risk in
comparison to standard access paths, since a user may cause
more damage to data and/or processes using a privileged
access path in comparison to a standard access path. A
privileged path may be defined as a series of "movements"
or "hops" between different systems, in order to authenticate
and authorize an entity (e.g., administrator) for obtaining
privileged access account to the resources and/or services
optionally on the service computing environment. The fol-
lowing is an example of a simple privileged access path:
User→authenticate to→IdP (identity provider)→authorize
access to →TargetSystem.

The outcome may be presented as an access graph, which
may be a sub-portion of the graph. For example, the outcome
in response to a query to search for privileged accesses may
be presented as a privileged access graph. The privileged
access graph may include one or more privileged access paths that lead to a target resource and/or service and/or service computing environment (i.e., TargetSystem).

Filters may be applied to the graph.

Referring now back to FIG. 8, an exemplary privileged access graph 2202 that shows 2 different privileged access paths 2204 and 2206 from a user 2208 to the same target system 2210 is presented.

A single real human user may be associated with multiple user accounts. The user accounts associated with each individual real human user may be obtained in response to execution of the query.

Other outcomes are described, for example, with reference to 206.

At 212, one or more automated actions may be taken in response to the outcome obtained from the execution of the query on the graph.

Optionally, the structure of the graph may be automatically analyzed to identify at least one sub-structure indicating a security risk. Examples of sub-structure(s) indicating the security risk include: a sub-structure indicating access to secrets, a sub-structure indicating permanent access of a user account to a target resource, a sub-structure indicating indirect access, and service accounts with passwords that have not been converted to a private key. Other examples include, an automated entity has been erroneously granted high privileges to secret company information. In yet another example, the same real person has three different user accounts for accessing the same resource. The analysis may be automatically triggered in response to execution of the query. Alternatively or additionally, the query may be for analyzing the graph to identify the security risk. An indication of the security risk represented by the identified sub-structure(s) may be provided, for example, presented on a display, forwarded to another device (e.g., administrative server), stored on a data storage device (e.g., log file), and/or fed into another process (e.g., for automated action, as described herein).

Optionally, in response to detecting the security risk, the identified sub-structure indicating the security risk may be automatically adapted to create an adapted sub-structure(s) with reduced or eliminated security risk. For example, high level access to the automated entity may be reduced to low level access. In another example, the three different user accounts for the same real user are reduced to a single user account.

Optionally, a login event denoting an access path by a user connecting from a source system to a target resource may be automatically detected. The source system may be the target computing environment described herein, a client terminal used by the user for connecting via the target computing environment, and the like. The target resource may be hosted externally by the service computing environment described herein, by the target computing environment, and the like. The graph may be updated by adding the login event to a current version of the graph. The graph may defines one or more access paths for each of the users of the source system and/or of the target resource. At least one user may be associated with two or more access paths to the same resource. The two or more access paths may be analyzed to determine if they pose a security risk. Action may be taken to reduce the security risk, for example, the two different access paths may be merged into a single access path.

The login event may be identified by identifying a unique identifier of the target computing environment to which the user has logged into, to gain access to the target resource. A source actor may be identified as a logical identity of the user that performed an authentication to the target computing environment. A unique identifier of the target resource may be identified. A target actor may be identified within the target resource linked to the source actor.

At 214, one or more features described herein with reference to 202-212 may be iterated. The iterations may be performed for dynamically updating the graph, for execution of multiple queries, and/or for automatic adaptation of the graph in response to changing conditions of the network.

Optionally, the graph is updated (and/or created) by the graph worker process. The graph worker may be the service responsible for processing login events and/or identity association messages for updating and/or constructing the graph (e.g., hosted in the graph DB).

As described herein, main components of the network may include the source provider, the actor, the target provider, and/or the target actor, which may be processed as follows. The source provider and target providers may be given under the top-level provider and the target. Provider fields respectively in a login event message.

An exemplary merge clause may include instructions to merge a provider (e.g., give provider IDs and/or account IDs and/or provider types) to create a set.

An actor node for the graph may be created, for example, using instructions to merge the actor (e.g., given actor ID and/or actor username) with the graph.

In some embodiments there may be two types of relationships represented as edges of the graph, which may be processed for a given login event message.

A relationship of an edge in a graph may be created and/or updated, for example, using merge instructions to define a relationship between the actors, including the source actor (in the source provider) that was used in order to log in, with a target actor (to the target provider).

A login event message may be used to associate two actors with their respective associated providers.

A single query may be used to perform multiple graph updates, for example, updating the graph using all currently collected updates. Using the single query may provide improved performance and/or code simplicity.

Exemplary constraints may be placed on the graph, such as on the nodes and/or relationships (i.e., edges). The constraints may be applied to ensure data integrity and/or improve query performance. Exemplary constraints on nodes include: per user ID, email, phone number, other unique identifier, and account ID. Exemplary constraints on relationships of the graph include, last seen, associated with, and the like.

An index on fields of the graph for fast search may be created. Uniqueness constraints may automatically create an index for the graph. Node labels may be assigned an index, for example, since a node label may be a combination of unique and required property constraints. Indexes may be created to provide fast lookups for a last_seen field of an ASSOCIATED_WITH and/or LOGGED_IN_WITH relationships, since it can be used in queries by the graph API service.

Referring now back to FIG. 3, at 302, a JIT access request is received. The JIT access request is made by a user for accessing a target resource to which the user does not currently have access to. For example, access privileges of the user are insufficient for accessing the target resource, or the user does not have any access privileges to the target resource.

The JIT access request may be received, for example, by the target computing environment, by an administrative server in communication with the target computing environment, an access control process running on the target computing environment, and the like.

The target resources is hosted by an external service computing environment. The JIT access request may be for accessing the external service computing environment via a target service computing environment accessed by the user via a client.

Examples of the target resource include: a service and/or application provided by an external service computing environment, a file hosted by the external service computing environment, and actions to be performed by the external service computing environment. In another example, the target resource is an active directly, which may become a JIT active directly upon being granted the JIT access request.

The JIT access request may be generated by a human user, for example, using a graphical user interface (GUI). The user may fill out fields within the GUI, for example, selecting an application, service, and/or resource, such as from a list. The user may enter the requested access permission level. The GUI generates the JIT access request accordingly. Alternatively, the JIT access request may be generated by an automated entity, for example, a robot, an artificial intelligence agent, a machine learning model, and the like.

The JIT request may include one or more of the following:
An identity of a user making the request.
A target resource and/or service to which access is requested.
A requested permission level, for example, standard permission, administrative permission, and the like.
A reason for the request to access the target resource,
The time interval for the temporary access to the target resource Referring now back to FIG. 2, at 304, additional data may be automatically accessed The additional data may be obtained by running a query on the graph mapping relationships between users and access privileges to different resources, for example, as described with reference to FIG. 2.

The additional data may include one or more of:
Associated with the identity of the user.
Additional data about the requesting user.
Tenant of a computing cloud into which the requesting user is logged into.
Additional data about the target resource.
Existing access privileges of the user to other resources.
Role and/or position of the user within an organization.
Denial or approval of historical access requests for the user, and/or to the requested resource.
Time and/or data of the JIT access request.
Geographical location from which the JIT access request is made.

An exemplary JIT request access message may be generated in response to a JIT request. A User ID may be extracted from the JWT token (e.g., as a sub field). A Tenant ID may be extracted from the JWT token.

In an example, a JIT access request message may be generated in a network of an organization that uses OKTA as an IdP to connect to other application within the network.

Referring now back to FIG. 2, at 306, the JIT access request is automatically analyzed The analysis may be performed in view of the additional data, such as the requested permission level, according to the reason, according to the requested time interval, and other additional data described herein.

The analysis may be performed relative to a target requirement, for determining whether the target requirement is met or not.

The analysis may be performed, for example, by one or more of:
By applying a set of rules defining a risk policy. The target requirement is met when the set of rules is met.
By computing a score indicating likelihood of a security threat. The target requirement may be met when the score is less than a threshold indicating a tolerated security risk.
By identifying at least one contradiction between the additional data and the JIT access request. The target requirement is met when there is no contradiction.
By feeding the JIT access request and/or additional data into a trained machine learning model, for example, a neural network, a classifier, a support vector machine, and the like. An indication of whether the target requirement is met or not may be obtained as an outcome of the machine learning model, for example, as a classification category. The machine learning model may be trained on a training dataset of records. A record may include a sample JIT access request and optionally corresponding additional data, and a ground truth indicating whether the target requirement is met or not.

At 308, in response to the analysis meeting the target requirement, temporary access to the user to access the target resource for a defined time interval may be automatically granted.

The defined time interval may be, for example, a certain amount of minutes initiated once access is made, a defined time which is fixed (e.g., 9 AM-11 AM) optionally on a certain date, and the like.

In a case where the user is a member of a group that includes other users, the temporary access may be granted exclusively to the user, and not granted to the other users of the group.

Optionally, the temporary access is granted without requiring a password for accessing the target resource by the user within the defined time interval. This simplifies the access for users, since users are spared from having to spent time creating passwords they will only use once (or rarely), and/or does not require a secure storage facility for storing multi-use passwords. Security may be provided by the temporary access, which once expired, cannot be used by the user until another JIT access request is made. Security may be provided by the analysis, which may be designed to identify security risks, such as malicious entities making the HIT request.

Optionally, in response to the analysis meeting the target requirement, a message may be automatically generated and sent to the host (e.g., target service environment) hosting the target resource, to set permission granting access to the user to access the target resource.

At 310, in response to expiration of the defined time interval, the temporary access is automatically revoked.

The temporary access may be automatically revoked by the host of the target resource, such as based on the message sent to the host for granting the temporary access. For example, an access timer is set, the automatically blocks access once time has expired. Alternatively or additionally, the temporary access may be automatically removed by the receiver of the JIT access request, such as an administrative Optionally, in response to revoking the access after the defined time interval expired, a clean-up may be automatically performed on the target service environment hosing the target resource. The clean-up may be performed for ensuring there are no left-overs from the temporary access.

Alternatively to 308, at 312 in response to the analysis not meeting the target requirement, a message indicating the JIT access request may be sent to another computer for manual review and approval. For example, the message may be sent to an administrative server. The JIT access request may be presented on a display. A user may manually approve or reject the JIT access request following a manual review.

Alternatively or additionally, each JIT access request may be sent to the other computer for manual review, for example, presented within a GUI on a display. The request and the additional details may be presented on a display, for example, for review by an administrator. The administrator may perform changes to the JIT access request, for example, change time limit, change permissions, scope-down resources, and the like.

The JIT access request may be manually approved or denied using the GUI.

Approved existing requests may be viewed and/or edited within the GUI, for example, access may be revoked manually prior to expiration of the automatically generated time interval.

Problems may be presented within the GUI for review, for example, access could not be granted, access could not be revoked, and the like.

Access decisions may be provided to the requestor, i.e., allowed or denied, for example, presented on a display of the client terminal used by the requesting user.

Referring now back to FIG. 9, a sequence diagram 3502 for processing a JIT access request is provided. The sequence diagram is depicted between external actors such as the requesting user, the assigned admin, and a notification system.

Referring now back to FIG. 10, an exemplary presentation 3062 of JIT access requests is depicted, optionally within a GUI. One or more of the following data elements may be presented for each access request: provider 3604 (e.g., the cloud service provider hosting the service to which access is being requested), requesting user 3606, permission type 3608 (e.g., connect), requested resource/app 3610, duration 3612 (e.g., for the access), requested on 3614 (e.g., data access was requested), and status 3616 (e.g., pending, granted, denied).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant access privileges will be developed and the scope of the term access is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of securing access for user accounts, comprising:

automatically creating and/or updating a graph mapping a plurality of nodes denoting real users to a plurality of user accounts and a plurality of resources hosted by a plurality of service computing environments external to a target computing environment accessed by the user accounts, and defining different permissions for user accounts for accessing the different resources, using data collected by a discovery service comprising a plurality of connectors implementing a generic connector interface, wherein each connector of the plurality of connectors is configured to transform application programming interface (API) responses from the plurality of service computing environments into connector response schemas that map to Identity and Access Management (IAM) messages, wherein a graph worker process automatically generates the graph based on the IAM messages sent over a network connecting the plurality of service computing environments and the target computing environment;

receiving a query for identifying at least one access path of user accounts for a target user with access privileges to a target resource;

executing the query on the graph to identify at least one access path;

providing details regarding at least one access path of user accounts of the target users from the execution of the query on the graph, the details of the at least one access path including at least one of: identifiers of the user accounts, resources accessible to the user accounts, access privileges for accessing the resources;

automatically analyzing the structure of the graph to identify an access graph comprising at least one sub-structure indicating a security risk of at least one access path that leads to a target resource and/or service and/or service computing environment, wherein each access path is defined as a series of hops between different systems via intermediate components; and sending a message to an administrative server and/or to an access control process running on the target service environment to automatically adapt access permissions associated with the at least one access path with the security risk according to an adapted at least one access path with reduced or eliminated security risk.

2. The computer implemented method of claim 1, wherein the graph further includes metadata of the plurality of real users, including roles.

3. The computer implemented method of claim 1, wherein the identified at least one sub-structure indicating the security risk is selected from: a sub-structure indicating access to secrets, a sub-structure indicating permanent access of a user account to a target resource, a sub-structure indicating indirect access, and service accounts with passwords that have not been converted to a private key.

4. The computer implemented method of claim 1, further comprising:

receiving a second query for identifying user accounts with access privileges to a target resource;

executing the second query on the graph; and providing the user accounts.

5. The computer implemented method of claim 1, wherein a single real human user may be associated with a plurality of user accounts, wherein the plurality of user accounts associated with each individual real human user are obtained in response to execution of the query.

6. The computer implemented method of claim 1, wherein the graph defines membership of users in groups, wherein the user accounts obtained in response to the execution of the query include resources accessible to members of the group.

7. The computer implemented method of claim 1, wherein the graph includes secret accesses accessible to each user, wherein the details obtained in response to the execution of the query include the secret accesses.

8. The computer implemented method of claim 1, wherein the graph includes indirect access by a user account to a target resource, wherein the indirect access is performed by a first user account accessing a first target resource, obtaining a second user account of the first target resources, and accessing a second target resource from the first target resource using the second user account, wherein the details obtained in response to the query include the indirect access.

9. The computer implemented method of claim 1, wherein the discovery process is designed for discovering access permissions of the plurality of user accounts of a plurality of users using the target computing environment, for accessing the plurality of resources hosted by the plurality of service computing environments external to the target computing environment.

10. The computer implemented method of claim 9, wherein the discovery process includes:

adding a connector to the generic connector interface hosting the plurality of connectors to a plurality of different external systems providing a plurality of different third-party services to a computing cloud used by the plurality of users, wherein the connector is set for integrating with an external system via API requests, wherein each connector is used to discover an environment of a corresponding external system, wherein each connector is per external system;

sending API requests to the external system via the connector, the API requests are for obtaining data regarding access to at least one third-party service hosted by the external system;

retrieving API responses from the external system via the connector;

transforming the API responses into connector response schemas, wherein the connector response schemas map between data of the external system provided in the API responses and the IAM messages.

11. The computer implemented method of claim 10, further comprising:

creating the connector response schema as a new connector response schema in a tenant service of the computing cloud, the new connector response schema for communicating with the external system; and implementing the API for communicating with the external system.

12. The computer implemented method of claim 10, wherein the connector interface defines implementations of the plurality of connectors, including existing connectors and future connectors.

13. The computer implemented method of claim 10, wherein the generic connector interface is designed to accommodate a plurality of different connector implementations, and the connector response schemas are generic, applicable to a plurality of different external systems.

14. The computer implemented method of claim 10, wherein the plurality of connectors are run in parallel.

15. The computer implemented method of claim 10, wherein a process for triggering the discovery service is handled by an independent service storing information of a last run for each tenant and connector, and publishes messages to trigger the runs.

16. The computer implemented method of claim 10, wherein each connector is an implementation of the connector interface.

17. The computer implemented method of claim 10, wherein the connector response schemas are defined schemas that specify output of each respective external system for being transformed into the IAM messages.

18. The computer implemented method of claim 10, wherein each connector includes a constructor that receives a configuration of a certain external system as input from a corresponding tenants configuration.

19. The computer implemented method of claim 1, further comprising:

identifying a login event denoting an access path by a user connecting from a source system to a target resource; and updating the graph by adding the login event to a current version of the graph, wherein the graph defines one or more access paths for each of the plurality of users, wherein at least one user is associated with two or more access paths to the same resource.

20. The computer implemented method of claim 19, wherein the login event is further identified by:

identifying a unique identifier of a target computing environment used by a user logged in to gain access to the target resource;

identifying a source actor comprising a logical identity of the user that performed an authentication to the target computing environment;

identifying a unique identifier of the target resource; and identifying a target actor within the target resource linked to the source actor.

21. Further comprising running a third query on the graph for searching for at least one access path according to at least one of: a user, a source system, an actor, and a target system, and providing the at least one access path.

22. The computer implemented method of claim 1, wherein each graph of a plurality of graphs is created for a single tenant of a plurality of tenants, wherein each graph is logically isolated from other graphs according to tenants.

23. The computer implemented method of claim 1, wherein the message comprises instructions for reducing or merging a plurality of different user accounts for a same real use to a single user account.

24. The computer implemented method of claim 1, the plurality of connectors are run in parallel, wherein each connector implements a respective generic connector interface and includes a corresponding constructor that receives a configuration of a corresponding external system as input from a tenant configuration, wherein the plurality of connectors transform API responses from the plurality of service computing environments into connector response schemas that are generic and applicable to multiple different external systems, wherein the graph denotes a common graph generated based on different API responses received from the plurality of service computing environments.

25. The computer implemented method of claim 1, wherein the discovery service includes error handling implemented in response to detecting a failure in a running connector, the error handling designed to prevent failure of the discovery service by logging and reporting failures of running connectors, the error handling.

26. The computer implemented method of claim 1, wherein the graph worker process creates specific nodes each associated with a single label and a node property defined according to its label, wherein nodes include Actor nodes with actor node properties comprising id, provider_id, username, first_seen, and last_seen, Provider nodes with provider node properties comprising id, account_id, and type, and Identity nodes with Identity node properties comprising id, email, phone_number, and display_name.

27. The computer implemented method of claim 1, wherein each connector integrates with a respective service computing environment to retrieve data including Users, Groups, Permissions, Applications, and Roles, and each connector generates an output including Connector Response Schemas that transforms the retrieved data into IAM messages, wherein the discovery process generates the IAM messages from the plurality of API responses from the plurality of service computing environments, wherein the graph is generated from the plurality of API responses via the IAM messages.

28. A system for securing access for user accounts, comprising:

at least one processor executing a code for:

automatically creating and/or updating a graph mapping a plurality of nodes denoting real users to a plurality of user accounts and a plurality of resources hosted by a plurality of service computing environments external to a target computing environment accessed by the user accounts, and defining different permissions for user accounts for accessing the different resources, using data collected by a discovery service comprising a plurality of connectors implementing a generic connector interface, wherein each connector of the plurality of connectors is configured to transform application programming interface (API) responses from the plurality of service computing environments into connector response schemas that map to Identity and Access Management (IAM) messages, wherein a graph worker process automatically generates the graph based on the IAM messages sent over a network connecting the plurality of service computing environments and the target computing environment;

receiving a query for identifying at least one access path of user accounts for a target user with access privileges to a target resource;

executing the query on the graph to identify at least one access path;

providing details regarding at least one access path of user accounts of the target users from the execution of the query on the graph, the details of the at least one access path including at least one of: identifiers of the user accounts, resources accessible to the user accounts, access privileges for accessing the resources;

automatically analyzing the structure of the graph to identify an access graph comprising at least one sub-structure indicating a security risk of at least one access path that leads to a target resource and/or service and/or service computing environment, wherein each access path is defined as a series of hops between different systems via intermediate components; and sending a message to an administrative server and/or to an access control process running on the target service environment to automatically adapt access permissions associated with the at least one access path with the security risk according to an adapted at least one access path with reduced or eliminated security risk.

29. A non-transitory medium storing program instructions for securing access for user accounts, comprising program instructions which when executed by at least one processor, cause the at least one processor to:

automatically create and/or update a graph mapping a plurality of nodes denoting real users to a plurality of user accounts and a plurality of resources hosted by a plurality of service computing environments external to a target computing environment accessed by the user accounts, and defining different permissions for user accounts for accessing the different resources, using data collected by a discovery service comprising a plurality of connectors implementing a generic connector interface, wherein each connector of the plurality of connectors is configured to transform application programming interface (API) responses from the plurality of service computing environments into connector response schemas that map to Identity and Access Management (IAM) messages, wherein a graph worker process automatically generates the graph based on the IAM messages sent over a network connecting the plurality of service computing environments and the target computing environment;

receive a query for identifying at least one access path of user accounts for a target user with access privileges to a target resource;

execute the query on the graph to identify at least one access path;

provide details regarding at least one access path of user accounts of the target users from the execution of the query on the graph, the details of the at least one access path including at least one of: identifiers of the user accounts, resources accessible to the user accounts, access privileges for accessing the resources;

automatically analyze the structure of the graph to identify an access graph comprising at least one substructure indicating a security risk of at least one access path that leads to a target resource and/or service and/or service computing environment, wherein each access path is defined as a series of hops between different systems via intermediate components; and sending a message to an administrative server and/or to an access control process running on the target service environment to automatically adapt access permissions associated with the at least one access path with the security risk according to an adapted at least one access path with reduced or eliminated security risk.

* * * * *